(12) United States Patent
Szarvas et al.

(10) Patent No.: US 7,804,631 B2
(45) Date of Patent: Sep. 28, 2010

(54) HOLOGRAPHIC STORAGE SYSTEM WITH APODIZATION FILTER

(75) Inventors: Gabor Szarvas, Budapest (HU); Krisztian Banko, Ajka (HU); Zoltan Karpati, Pecs (HU); Szabolcs Kautny, Budapest (HU)

(73) Assignee: Thomson Licensing, Boulogne-Billancourt (FR)

( * ) Notice: Subject to any disclaimer, the term of this patent is extended or adjusted under 35 U.S.C. 154(b) by 380 days.

(21) Appl. No.: 11/974,604

(22) Filed: Oct. 15, 2007

(65) Prior Publication Data

US 2008/0123166 A1 May 29, 2008

(30) Foreign Application Priority Data

Oct. 13, 2006 (EP) .................................. 06122230
Nov. 8, 2006 (EP) .................................. 06123657

(51) Int. Cl.
*G03H 1/10* (2006.01)
(52) U.S. Cl. .............................. 359/10; 359/22; 369/103
(58) Field of Classification Search .................. 359/10, 359/22, 24, 29, 35; 369/103
See application file for complete search history.

(56) References Cited

U.S. PATENT DOCUMENTS

| 4,013,338 | A | * | 3/1977 | Sato et al. ........................ 359/29 |
| 4,063,226 | A | | 12/1977 | Kozma et al. |
| 2002/0191236 | A1 | | 12/2002 | King |
| 2003/0039001 | A1 | | 2/2003 | King et al. |
| 2005/0231777 | A1 | * | 10/2005 | Curtis ............................ 359/35 |
| 2006/0082851 | A1 | | 4/2006 | Toishi |
| 2006/0126141 | A1 | * | 6/2006 | Hirao et al. ...................... 359/3 |

FOREIGN PATENT DOCUMENTS

| GB | 1 342 476 | 1/1994 |
| WO | WO 00/20929 A1 | 4/2000 |
| WO | WO 01/57859 | 8/2001 |
| WO | WO 2004/102541 | 11/2004 |
| WO | WO 2006/003077 | 1/2006 |

OTHER PUBLICATIONS

Search Report Dated Apr. 19, 2007.
Horimai Hideyoshi et al: "High Density Recording Storage System by Collinear TM Holography Proceedings of the SPIE, SPIE, Bellikngham, VA. US. vol. 6187. 2006, XP007902094 ISSN: 0277-786X.
Hideyoshi Horimai et al: "Advanced Collinear Holography" Optical Review, Springer-Verlag. BE, vol. 12. No. 2, Mar. 1, 2005, pp. 90-92, XP019353262 ISSN: 1349-9432.
Hideyoshi Horimai et al: "Collinear Hologtraphy" Applied Optics, OSA, Optical Society of America, Washington,DC, US vol. 44, No. 13. May 1, 2005, pp. 2575-2579, XP007901854 ISSN: 0003-6935.
J. Ashley et al., "Holographic Data Storage", IBM J. Res. Develop., vol. 44, No. 3, 3 May 2000, pp. 341-368.

* cited by examiner

*Primary Examiner*—Alessandro Amari
(74) *Attorney, Agent, or Firm*—Robert D. Shedd; Joseph J. Opalach; Jerome G. Schaefer

(57) ABSTRACT

The present invention relates to an apparatus for reading from and/or writing to holographic storage media, and more specifically to an apparatus for reading from and/or writing to holographic storage media having an apodization filter. According to the invention, an apparatus for reading from and/or writing to a holographic storage medium, with a collinear split aperture arrangement of a reference beam and an object beam or a reconstructed object beam, includes an apodization filter for the reference beam.

8 Claims, 5 Drawing Sheets

HOLOGRAPHIC STORAGE SYSTEM WITH APODIZATION FILTER

This application claims the benefit, under 35 U.S.C. §119 and the International Convention for the Protection of Industrial Property of European Patent Application No. 06122230.3 filed Oct. 13, 2006 and European Patent Application No. 06123657.6 filed Nov. 8, 2006.

FIELD OF THE INVENTION

The present invention relates to an apparatus for reading from and/or writing to holographic storage media, and more specifically to an apparatus for reading from and/or writing to holographic storage media having an apodization filter.

BACKGROUND OF THE INVENTION

In holographic data storage digital data are stored by recording the interference pattern produced by the superposition of two coherent laser beams, where one beam, the so-called 'object beam', is modulated by a spatial light modulator and carries the information to be recorded. The second beam serves as a reference beam. The interference pattern leads to modifications of specific properties of the storage material, which depend on the local intensity of the interference pattern. Reading of a recorded hologram is performed by illuminating the hologram with the reference beam using the same conditions as during recording. This results in the reconstruction of the recorded object beam.

One advantage of holographic data storage is an increased data capacity. Contrary to conventional optical storage media, the volume of the holographic storage medium is used for storing information, not just a few layers. One further advantage of holographic data storage is the possibility to store multiple data in the same volume, e.g. by changing the angle between the two beams or by using shift multiplexing, etc. Furthermore, instead of storing single bits, data are stored as data pages. Typically a data page consists of a matrix of light-dark-patterns, i.e. a two dimensional binary array or an array of grey values, which code multiple bits. This allows to achieve increased data rates in addition to the increased storage density. The data page is imprinted onto the object beam by the spatial light modulator (SLM) and detected with a detector array.

In a holographic storage system with a coaxial arrangement the reference beam and the object beam use a single split aperture. In addition, both beams are modulated by the same SLM. The information is stored in the form of multiplexed Fourier holograms. For a reflection type coaxial holographic storage system it is difficult to couple in the object beam and the reference beams during recording, and also to couple out the reference beam from the reconstructed object beam during reading. As disclosed in EP 1 624 451, in order to increase the selectivity of a so-called collinear arrangement, the reference beam is also pixelated. The object beam and the reference beam are modulated with the same SLM. This arrangement is also known as a so-called split aperture arrangement, as both the object plane and the image plane of the holographic optical system are split into object and reference areas. At the image plane, which is the plane of the detector, the reference pixels form a sharp image and are blocked. A similar transmission type coaxial split aperture system is disclosed in U.S. Pat. No. 6,108,110.

During reading the reference beam is partially diffracted into the image zone. This is depicted in FIG. 1, which shows a model of the diffracted reference beam without any object beam. The data pixels are all off. Part a) of FIG. 1 uses a linear scaling, whereas part b) uses a logarithmical scaling. The reason for this diffraction noise is the low-pass filtering behavior of the optical system. The exit pupil of the optical system causes a sharp cutting of the high frequency components. Because of this sharp cutting, the reference beam is spread out onto the detector surface. This means that a high diffraction efficiency is needed to achieve a sufficient signal-to-noise ratio (SNR) of the image pattern relative to the reference beam diffraction noise. In the conventional setup, almost 0.1% of the energy of the reference beam is diffracted into the image area. At a practically acceptable diffraction efficiency of $10^{-6}$ to $10^{-5}$, this means that the total energy of the diffraction noise is several times larger (typically 50-500 times larger) than the total energy of the reconstructed data pattern. As can be seen in FIG. 1, the SNR is better in the middle of the image circle and worse close to the outer rim. To achieve low error rates, a high diffraction efficiency is needed, which requires a strong refractive index grating to be recorded in the holographic storage material.

As a consequence, even though the collinear arrangement has a very good selectivity, its SNR is limited. For further details see Horimai et al.: "Collinear Holography", Appl. Opt. Vol. 44, 2575-2579, and Horimai et al.: "High-density recording storage system by Collinear holography" Proc. SPIE 6187, 618701. As a result of the limited SNR the data density is still limited by the dynamic range of the material, because it is not feasible to multiplex a large number of holograms with a sufficiently large diffraction efficiency.

The main factor of the noise generation is the sharp cutting of the high frequency components. Therefore, increasing the object space numerical aperture, or in other words increasing the radius of the Fourier-plane filter, would not have a sufficient effect if the high frequency components are still cut sharply. Table 1, which shows the total power of the noise within the image area divided by the total power of the reference beam for different radii of the Fourier-plane filter. In the table the radii are given in relation to the Nyquist aperture $D_N$, which is defined as $$D_N = \frac{f \times \lambda}{pixelsize},$$

where f is the focal length of the Fourier objective. The wavelength is measured in the storage material. As can be seen, increasing the filter radius from $0.67 \times D_N$ by a factor of 1.6 to $1.07 \times D_N$ means that the noise is reduced to about 1/30th of its original value. For a system with $\lambda = 267$ nm (the material refractive index is n=1.5), f=7 mm and a pixel size of 12 μm, this means an increase of the diameter from 249 μm to 398 μm. However, the noise is still in the same order of magnitude as the reconstructed object beam, which is not sufficient. Furthermore, this solution has the disadvantage that it requires a better lens system with a larger NA in the object space.

TABLE 1

Total power of the noise within the image area divided by the total power of the reference beam for different radii of the Fourier-plane filter.

| FP filter radius/$D_N$ | Noise ratio |
|---|---|
| 0.67 | 4.58E−04 |
| 0.73 | 3.10E−04 |
| 0.80 | 2.03E−04 |
| 0.87 | 1.16E−04 |
| 0.93 | 5.87E−05 |
| 1.00 | 2.43E−05 |
| 1.07 | 1.29E−05 |

TABLE 1-continued

Total power of the noise within the image area divided by the total power of the reference beam for different radii of the Fourier-plane filter.

| FP filter radius/$D_N$ | Noise ratio |
| --- | --- |
| 1.13 | 2.24E−05 |
| 1.20 | 4.70E−05 |
| 1.27 | 8.59E−05 |

In Kimura: "Improvement of the optical signal-to-noise ratio in common-path holographic storage by use of a polarization-controlling media structure", Opt. Let., Vol. 30, 2005, a polarization method for suppressing the noise originating from the reference beam is disclosed. According to this solution the reconstructed object beam and the reference beam are orthogonally polarized. The noise caused by the reference beam is suppressed by a polarization filter. This solution requires a complex holographic storage medium structure with a quarter wave plate on top and on the bottom of the holographic storage material. The efficiency of the polarization-based suppression depends on the numerical aperture. The suppression only works properly for a small NA. However, a high NA in the Fourier plane is required for high data density storage.

SUMMARY OF THE INVENTION

It is an object of the invention to propose a further solution for reducing the reference beam diffraction noise in an apparatus for reading from and/or writing to holographic storage media with a coaxial arrangement.

According to the invention, this object is achieved by an apparatus for reading from and/or writing to a holographic storage medium, with a collinear split aperture arrangement of a reference beam and an object beam or a reconstructed object beam, which includes an apodization filter for the reference beam. Apodization means the modification of the amplitude transmittance of an aperture of an optical system, e.g. by softening the edges of the aperture using an increasing attenuation towards the edges. During reading reference beam diffraction noise occurs in the image area of the coaxial split aperture holographic arrangement. The origin of this noise is the finite bandwidth of the transfer function of the optical system, which causes a spread of the pixels of the reference beam into the object area. This reference beam diffraction noise is reduced by about two orders of magnitude when an apodization filter is used. When the reference beam diffraction noise is reduced by apodization, a several hundred times lower diffraction efficiency of the recorded holograms is sufficient to reach the same signal to noise ration as for holograms recorded without apodization. This allows to reduce the change of the refraction index, which has to be obtained during recording of a hologram, to ¹⁄₂₀th to ¹⁄₃₀th of its value without apodization. In other words, the data density can be increased by a factor of 20 to 30 while maintaining the same saturation level of the holographic storage material. In addition, in case of the development of improved holographic storage material with a higher M#, i.e. a higher dynamic range, the reduction of the necessary energy by apodization would allow to avoid the non-linear domain of the holographic storage material. This leads to shorter writing times.

Preferably, the transmission of the apodization filter has a gradual decrease in a range from an inner radius to an outer radius around a cut-off radius. The gradual decrease advantageously follows one of a linear function, a quadratic function, or a Gaussian function. Of course, other functions can also be used. The gradual decrease of the transmission causes a widening of the pixels of the reference beam, but confines the reference beam diffraction noise to a large distance from an area of the reconstructed object beam on a detector. Simulations yielded optimum results of the range of the gradual decrease between 10.8% and 21.6% of the Nyquist aperture $D_N$, with a cut-off radius between 0.67 and 1.27 times the Nyquist aperture.

Advantageously, the apodization filter is located in the Fourier plane of a 4f system. This has the advantage that the apodization filter can be adjusted relative to the optical path very easily. In addition, when the apodization filter is located in the Fourier plane, the apodization effect is similar and symmetric for all pixels. As a consequence the retransformed image is homogenous. When the filter was shifted out of the Fourier plane, the apodization effect would be different for the central pixels and the pixels near the border of the object plane. This would cause inhomogeneously filtered pixels in the retransformed image.

Preferably, the object beam and the reference beam have at least partly separate optical paths, and the apodization filter is arranged in the separate optical path of the reference beam. In this way the apodization filter act only on the reference beam and any apodization of the object beam is avoided, which could otherwise lead to slightly increased error rates.

In order to separate the object beam and the reference beam, the apparatus favorably has a ring shaped half wave plate, which changes the polarization of the reference beam, and a polarization beam splitter. The ring shaped half wave plate does not influence the polarization of the object beam, such that the object beam and the reference beam have different polarizations. Therefore, they can easily be separated using the polarization beam splitter.

Advantageously, the apparatus has a further ring shaped half wave plate in an intermediate object plane, which changes the polarization of the reference beam once again. In this way the reference beam and the object beam have the same polarization, which allows to use a conventional collinear split aperture arrangement for the remaining part of the optical system.

BRIEF DESCRIPTION OF THE DRAWINGS

For a better understanding the invention shall now be explained in more detail in the following description with reference to the figures. It is understood that the invention is not limited to this exemplary embodiment and that specified features can also be expediently be combined and/or modified without departing from the scope of the present invention. In the figures.

DETAILED DESCRIPTION OF PREFERRED EMBODIMENTS

Figure 1:
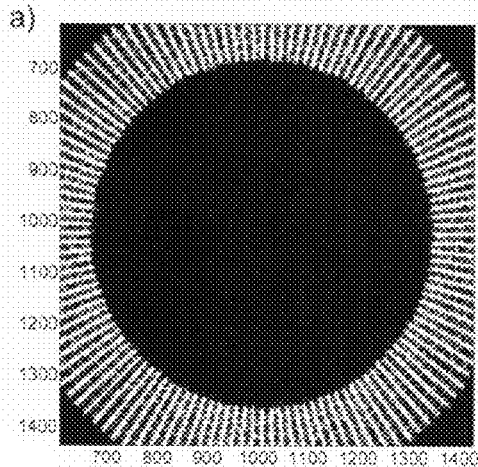
FIG. 1 illustrates a model of reference beam diffraction into an image area.
Figure 1:
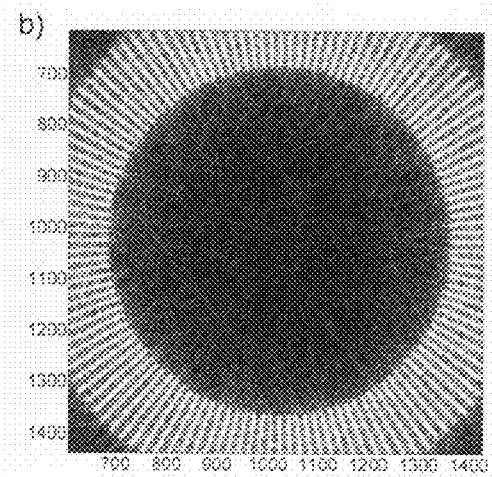
Figure 2:
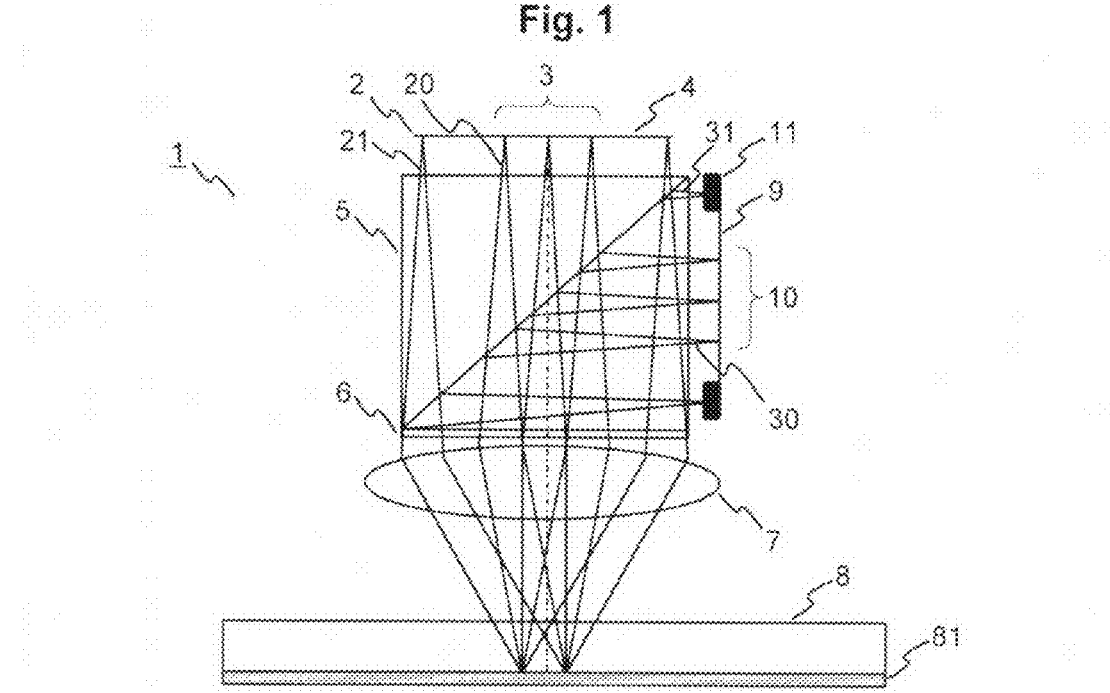
FIG. 2 depicts a conventional arrangement of a reflection type collinear split aperture holographic storage system.
Figure 3:
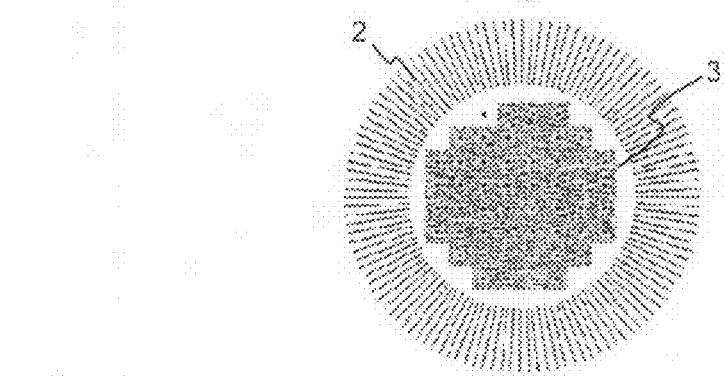
FIG. 3 illustrates the arrangement of the reference and object areas on the SLM or the detector surface.

FIG. 2 shows a simplified conventional arrangement of a reflection type coaxial split aperture holographic storage system 1. During writing a spatial light modulator 2 (SLM), which is divided into an object area 3 and a reference area 4, generates writing beams (object beam 20 and reference beam 21) from an incoming light beam (not shown). The arrangement of the object area 3 and the reference area 4 on the SLM 9 is shown in FIG. 3. The arrangement is the same on the surface of a detector. The writing beams 20, 21 pass a polarization beam splitter (PBS) cube 5 and a quarter wave plate 6, before they are focused by an objective lens 7 into a holographic storage medium 8. During reading the holographic storage medium is illuminated by the reference beam 21 only. In this way a reconstructed object beam 30 is obtained, which is reflected by a reflective layer 81 of the holographic storage medium 8 and collimated by the objective lens 7. The reference beam 21 is also reflected by the reflective layer 81 and collimated by the objective lens 7. The writing beams 20, 21 and the readout beams (reconstructed object beam 30 and reflected reference beam 31) have an orthogonal polarization due to the quarter wave plate 6. Therefore, the PBS cube 5 deflects the readout beams 30, 31 towards a detector 9. A beam stop 11 around an object area 10 of the detector 9 blocks the reflected reference beam 31 such that it does not reach the detector surface. Because of the finite bandwidth of the optical system with a sharp cutting of the spatial-frequency transfer function, the pixels of the reflected reference beam 31 spread out onto the object area 10 of the detector 9. Due to the finite dynamic range of the holographic storage material, if multiple holograms are multiplexed into same volume of the holographic storage material, the intensity of the reference diffraction noise is about 1 to 2 orders of magnitude higher than the intensity of the reconstructed object beam 30. This leads to a very low SNR of the arrangement.

Figure 4:
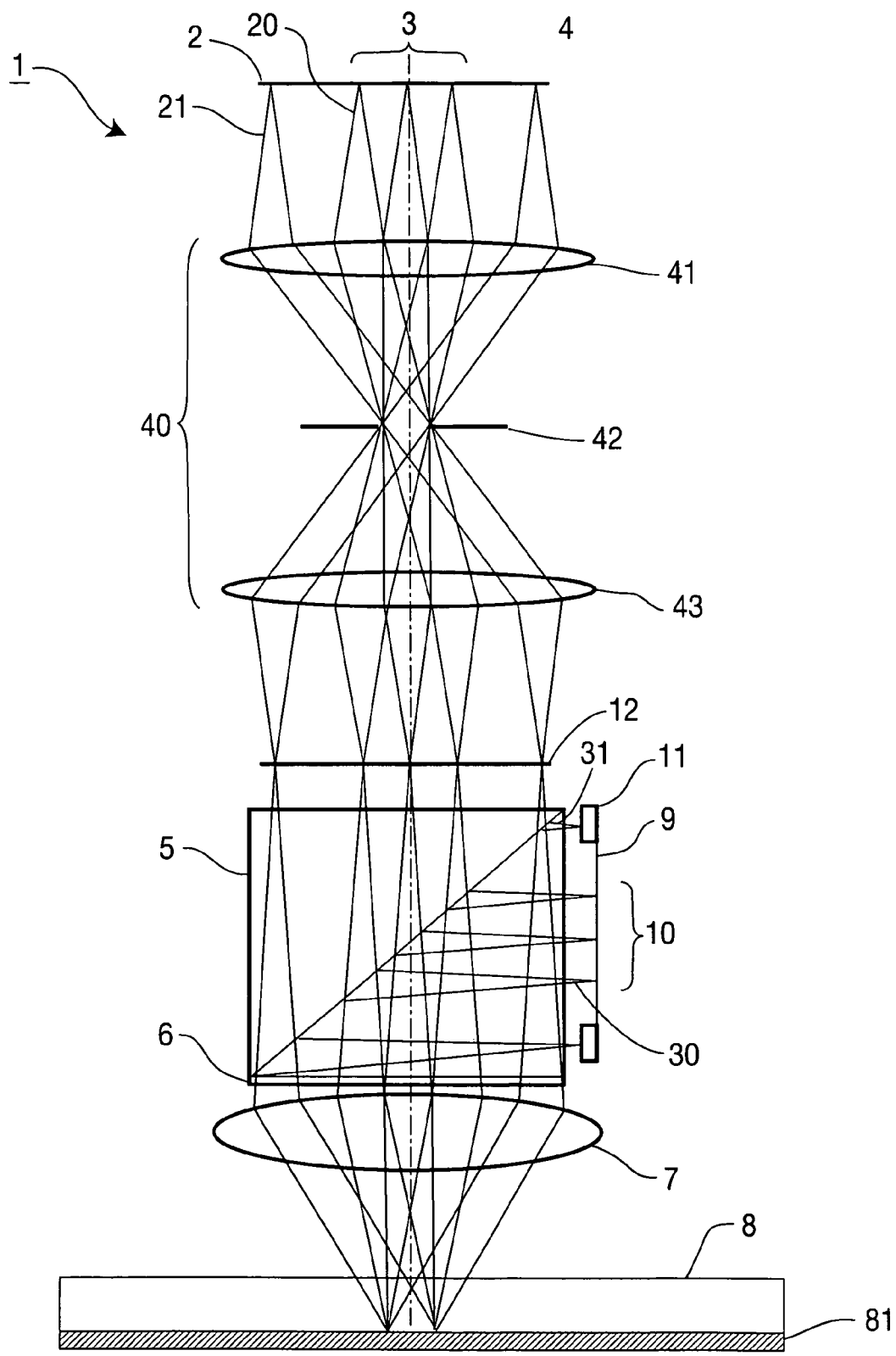
FIG. 4 shows a first optical arrangement of a collinear split aperture holographic storage system according to the invention.

FIG. 4 shows a first optical arrangement of a collinear split aperture holographic storage system according to the invention. This arrangement includes an additional 4f relay system 40. A first Fourier lens 41 transforms the object beam 20 and the reference beam 21 into the Fourier plane. A second Fourier lens 43 re-transforms the object beam 20 and the reference beam 21 in an intermediate object plane 12. Located in the common focal plane between the Fourier lenses 41, 43 of the 4f system 40 is a special so-called apodization or filter 42 (also called apodizing filter). In contrast to the sharp cutting of the conventional arrangement, the apodization filter 42 gradually suppresses the higher frequency components of the Fourier transform of the object beam 20 and the reference beam 21. This gradual suppression causes a widening of the pixels, but confines the diffraction noise to a large distance from the object area 10 on the detector 9. See also Joseph W. Goodman, Fourier Optics, McGraw-Hill International Editions, pp 152-154.

Figure 5:
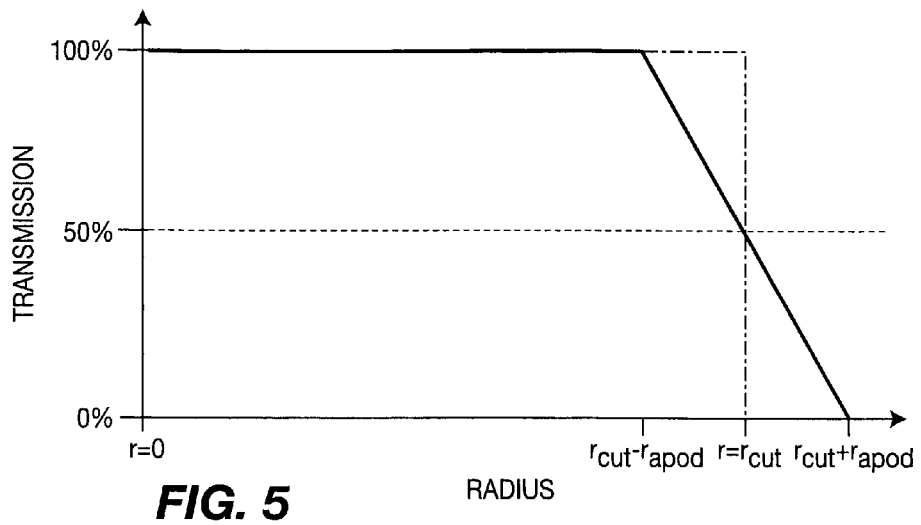
FIG. 5 illustrates the transmission curve of the apodization filters.

FIG. 5 shows transmission curve of the apodization filter 42 as a function the radial coordinate r of the apodization filter 42. For comparison a dash-dotted line shows the transmission curve of a simple aperture with a radius $r_{cut}$. At the edge of the apodization filter 42 starting at an inner radius $r_{cut}-r_{apod}$ until an outer radius $r_{cut}+r_{apod}$ the transmission linearly decreases from 100% to 0%. Of course, this linear apodization function is only one example. Other types of transmission curves may likewise be used, e.g. parabolic, Gaussian etc. The use of a simple linear apodization filter 42 leads to a reduction of the diffraction noise to less than 1/200th to 1/800th of its original value. At the same time the filter radius is only slightly increased. Results of a simulation are give in the following Table 2.

TABLE 2

Total power of noise inside the object area divided by the total power of the reference beam (after FP filtering).

| FP filter radius/$D_N$ | no apodization | apodization from −5.4% to +5.4% of $D_N$ | apodization from −10.8% to +10.8% of $D_N$ |
| --- | --- | --- | --- |
| 0.67 | 4.58E−04 | 2.07E−06 | 5.18E−07 |
| 0.73 | 3.10E−04 | 1.44E−06 | 3.63E−07 |
| 0.80 | 2.03E−04 | 9.22E−07 | 2.40E−07 |
| 0.87 | 1.16E−04 | 5.58E−07 | 1.61E−07 |
| 0.93 | 5.87E−05 | 2.86E−07 | 9.26E−08 |
| 1.00 | 2.43E−05 | 1.37E−07 | 5.95E−08 |
| 1.07 | 1.29E−05 | 8.79E−08 | 4.33E−08 |
| 1.13 | 2.24E−05 | 1.20E−07 | 4.48E−08 |
| 1.20 | 4.70E−05 | 2.15E−07 | 6.38E−08 |
| 1.27 | 8.59E−05 | 3.56E−07 | 9.06E−08 |

Figure 6:
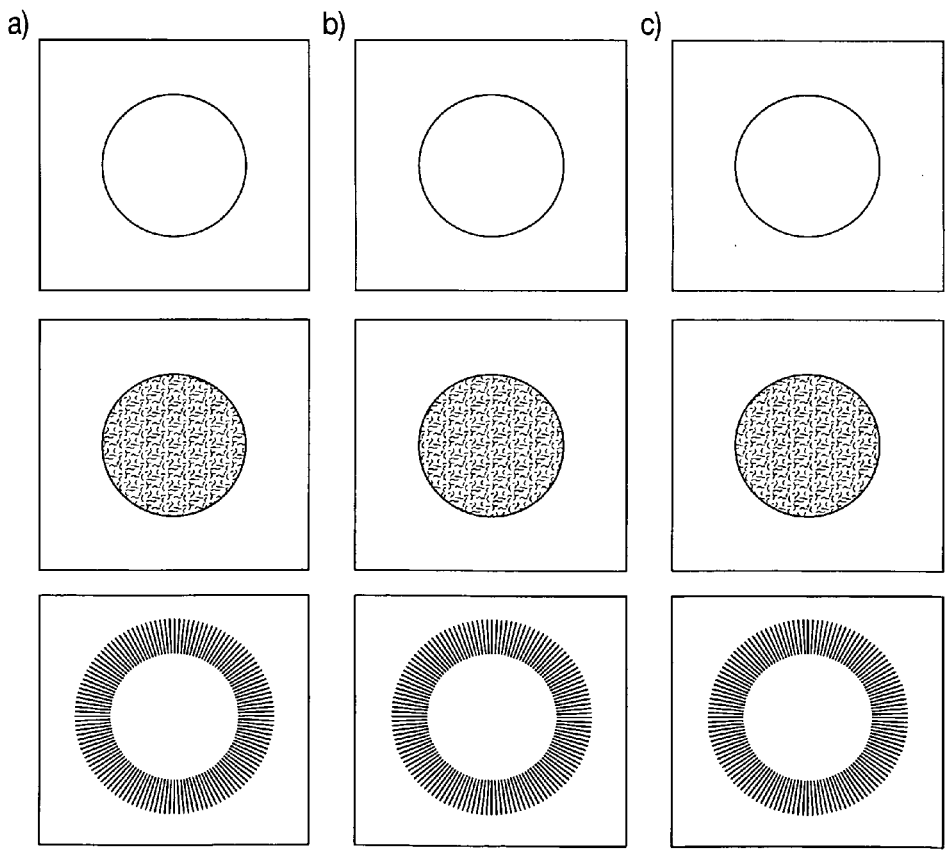
FIG. 6 illustrates the effects of different apodization filters on the reference beam diffraction noise in the Fourier plane and the intermediate object plane.

FIG. 6 illustrates the effects of different apodization filters 42 on the reference beam diffraction noise in the Fourier plane and the intermediate object plane 12. The top row schematically shows the transmission of the apodization filter. The middle row shows the filtered Fourier-plane image of the reference beam 21. The bottom row shows the filtered reference beam 21 in the intermediate object plane 12. Parts a), b), and c) refer to an apodization of ±0% of $D_N$, ±5.4% of $D_N$, and ±10.8% of $D_N$ around the radius $r_{cut}=0.67 \times D_N$. The image of the reference beam 21 becomes visibly clearer when apodization is used. For eliminating the high intensity peak at the center of the Fourier plane, during the model calculation a so-called "Ternary Phase-Amplitude" modulation was used. This means that the white pixels have two different phases, with a random spatial distribution. The phase of the first half of the white pixels is 0, while the other half of the white pixels has a phase of π. Thus there is no average intensity in the center of the Fourier transformed image. For further details see L. Domjan et al.: "Ternary phase-amplitude modulation with twisted nematic liquid crystal displays for Fourier-plane light homogenization in holographic data storage" Optik Vol. 113 (2002), pp 382-390.

The results of single-hologram simulations with a setup with $r_{cut}=124.5$ μm are presented below in Table 3. The first row of the table serves as a reference, with a "unit amount" of energy and the resulting SNR, symbol error rate (SER), and bit error rate (BER). As can be seen from the second and third row of the table, increasing the energy decreases the SER, whereas reducing the energy leads to worse results, as the reference noise becomes comparable to the energy of the reconstructed object beam. The last two rows of the table show that apodization of the reference beam 21 leads to a reduction of the symbol error rate and, consequently, the bit error rate. At the same time apodization allows to use lower energies, which enables a better utilization of the dynamic range of the holographic storage material. It is to be noted that in the simulations no apodization was used for filtering the object beam 20.

TABLE 3

Influence of apodization on SNR and error rates.

| | SNR | SER | BER |
|---|---|---|---|
| No apodization, $2 \times r_{cut}/D_N = 0.67$ | 1.15 | 25.4% | 3.91% |
| No apodization, more than twice the energy | 2.17 | 5.7% | 0.72% |
| No apodization, $\frac{1}{4}^{th}$ of energy | 0.67 | 67.9% | 13.0% |
| Apodization (10.8% of $D_N$), $\frac{1}{4}^{th}$ of energy | 2.21 | 4.0% | 0.50% |
| Apodization (10.8% of $D_N$), $\frac{1}{20}^{th}$ of energy | 2.19 | 4.2% | 0.52% |

Figure 7:
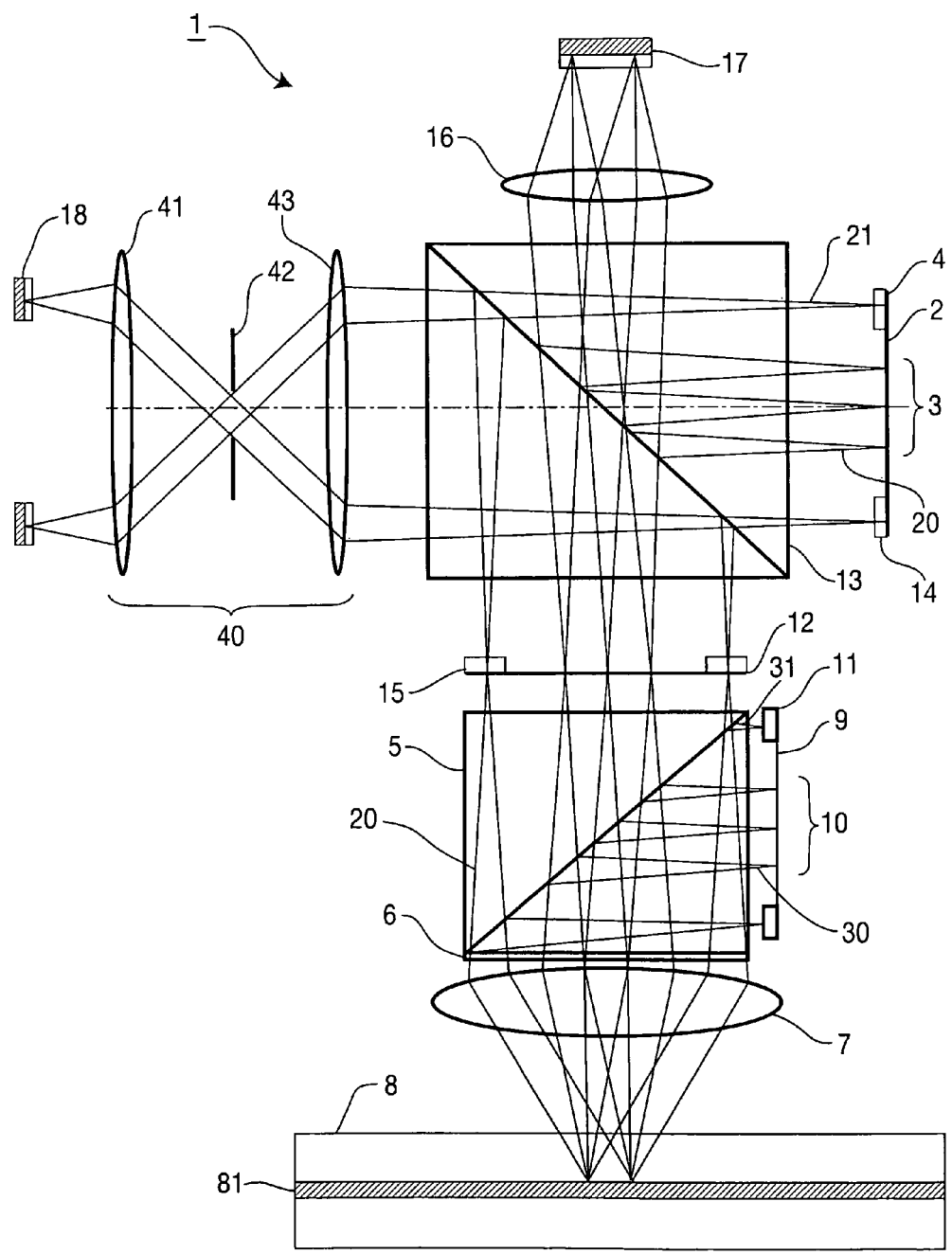
FIG. 7 shows a second optical arrangement of a collinear split aperture holographic storage system according to the invention.

In the optical arrangement of FIG. 4 apodization is applied to both the object beam 20 and the reference beam 21. However, the apodization of the object beam 21 slightly decreases the readout image quality. FIG. 7 shows a second optical arrangement of a collinear split aperture holographic storage system according to the invention, which overcomes this drawback. In this arrangement the reference beam 21 is apodized independently of the object beam 20. The SLM 2 is illuminated by an S polarized beam. A PBS cube 13 reflects the S polarized object beam 20 towards a Fourier lens 16. Located in the Fourier plane of this lens 16 is a reflection type Fourier filter 17 with a quarter wave plate. The Fourier transformed, filtered and reflected object beam 20 passes again the Fourier lens 16 and the PBS cube 13. The Fourier lens 16 re-transforms the filtered object beam 21 into the intermediate object plane 12. Located at the reference area 4 of the SLM 2 is a ring type half wave plate 14. Thus the reference beam 21 is P polarized after the half wave plate 14. The P polarized reference beam 21 passes through the PBS cube 13 and enters a standard 4f Fourier transforming, re-transforming system 40 consisting of two Fourier lenses 41, 43. An apodization filter 42 is located in the inner (common) focal plane of this 4f system 40. As the object beam 20 and the reference beam 21 follow independent optical paths, the apodization filter 42 acts only on the reference beam 21. Arranged at the back focal plane of the 4f system 40 is a ring type mirror 18 with a quarter wave plate. Therefore, the reflected reference beam 21 becomes S polarized. The 4f system 40 images the reflected, S polarized reference beam 21 trough the PBS cube 13 onto the intermediate object plane 12. In the area of the reference beam 21 at the intermediate object plane 12 there is another ring type half wave plate 15. This converts the S polarized reference beam 21 into a P polarized reference beam 21. Thus the apodized reference beam 21, and the independently Fourier filtered object beam 20, have the same polarization after the intermediate object plane 12. The remaining parts of the arrangement operate in the same way as the optical arrangement shown in FIG. 2.

Figure 8:
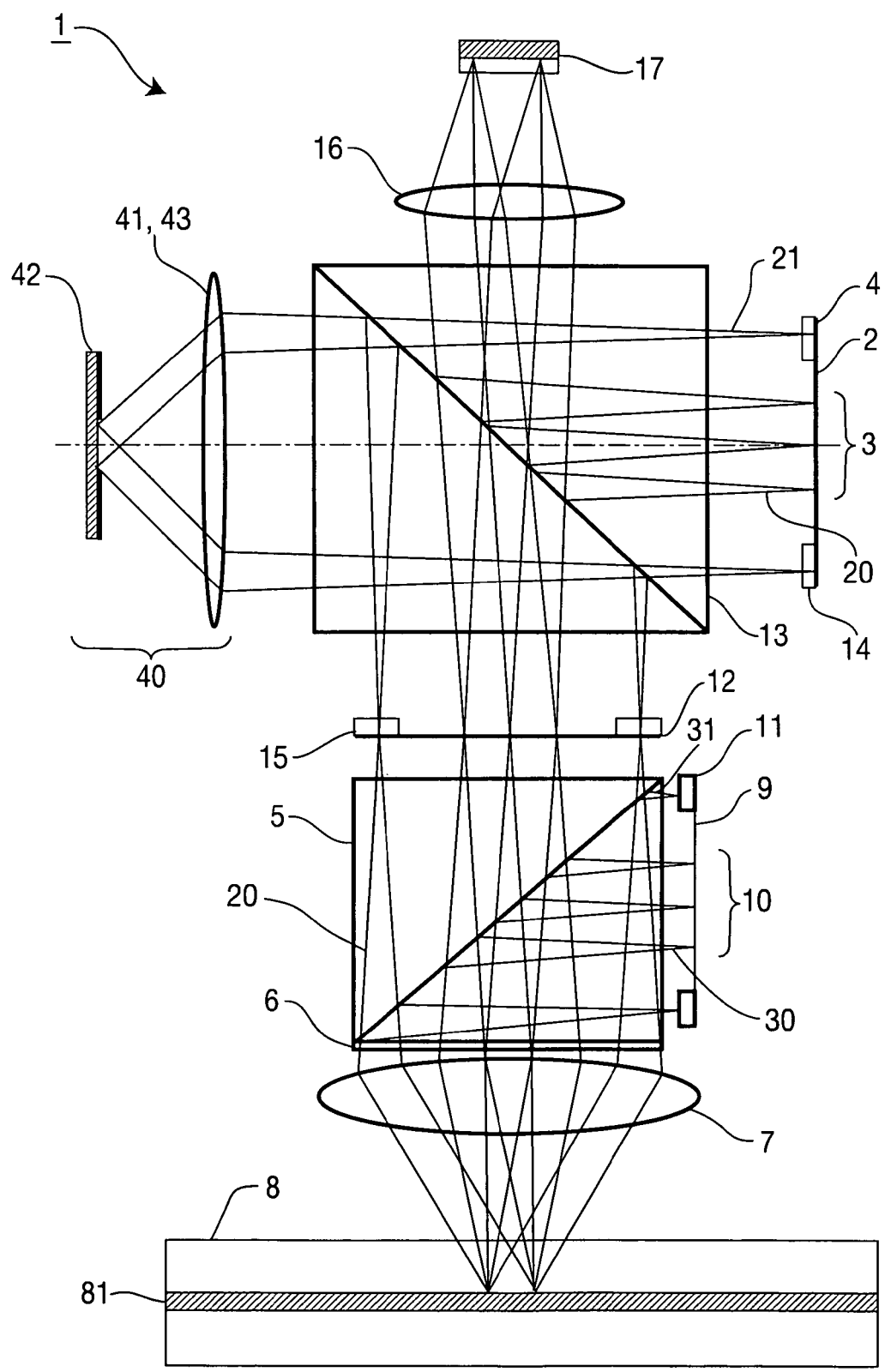
FIG. 8 shows a third optical arrangement of a collinear split aperture holographic storage system according to the invention.

A third optical arrangement of a collinear split aperture holographic storage system according to the invention is illustrated in FIG. 8. Again the reference beam is apodized independently of the object beam 20. The separation of the object beam 20 and the reference beam 21 is similar to the one shown in FIG. 7. In this arrangement the apodization filter 42 is a reflection type filter and includes a quarter wave plate.

In the embodiments of FIGS. 7 and 8 a folded 4f system is arranged in the object arm. In this case a mirror and a quarter wave plate are placed in the back focal plane of the Fourier lens 16. In addition, the transmission type Fourier filter is replaced with a reflection type Fourier filter 17.

In the above described embodiments a transmission type SLM 2 is used. Of course, the solution also works with a reflection type SLM. In this case one more PBS cube needs to be provided for the illumination of the SLM.

What is claimed is:

1. Apparatus for reading from and/or writing to a holographic storage medium, with a collinear split aperture arrangement of a reference beam and an object beam or a reconstructed object beam, including an apodization filter for the reference beam, wherein a transmission of the apodization filter has a gradual decrease in a range from an inner radius to an outer radius around a cut-off radius between 0.67 and 1.27 times the Nyquist aperture.

2. Apparatus according to claim 1, wherein the range of the gradual decrease is between 10.8% and 21.6% of the Nyquist aperture.

3. Apparatus according to claim 1, wherein the gradual decrease has one of a linear function, a quadratic function, or a Gaussian function.

4. Apparatus according to claim 1, wherein the apodization filter is located in the Fourier plane of a 4f system.

5. Apparatus according to claim 1, wherein the object beam and the reference beam have at least partly separate optical paths, and the apodization filter is arranged in the separate optical path of the reference beam.

6. Apparatus according to claim 5, having a ring shaped half wave plate for changing the polarization of the reference beam and a polarization beam splitter for separating the object beam and the reference beam.

7. Apparatus according to claim 6, having a further ring shaped half wave plate in an intermediate object plane for changing the polarization of the reference beam.

8. Method for shaping a reference beam in a collinear split aperture arrangement of the reference beam and an object beam or a reconstructed object beam, having the step of apodizing the reference beam with an apodization filter, wherein a transmission of the apodization fitter has a gradual decrease in a range from an inner radius to an outer radius around a cut-off radius between 0.67 and 1.27 times the Nyquist aperture.

* * * * *